Patented Aug. 3, 1954

2,685,526

UNITED STATES PATENT OFFICE 2,685,526

GLASS COMPOSITION

Dominick Labino, Waterville, Ohio, assignor to Glass Fibers, Inc., Waterville, Ohio, a corporation of Ohio No Drawing. Application June 15, 1951,
Serial No. 231,909

7 Claims. (Cl. 106—50)

This invention relates to fiber glass. More particularly the invention relates to a glass composition for the manufacture of glass fibers.

Production of glass fibers attained by melting glass compositions and passing the melted glass through small openings to obtain molten strands is known to the art. In these known processes the extruded strands are blown into long fine staple fibers which may attain a diameter as low as 30-millionths of an inch. Thus in the usual method of producing blown staple a glass strand is moved through a tubular element across the exit mouth of which a hot flame containing gases under pressure is applied. The glass strand is melted by the intense heat which may be in the neighborhood of 3000° F. and the molten material is blown transversely to the tubular element by the pressure of the gases and stretches out thereby attaining a much smaller diameter than that of the original strand. The blown material is then collected on a conveying element moving transversely to the direction of the blown fine staple fibers.

However in this known method the smallest fiber diameter attainable has been, as noted, 30-millionths of an inch. This limitation has been imposed by the nature of the glass composition the characteristics of the known glass materials being such that fiber breakage occurs when an attempt is made to blow the fiber to smaller diameters. For example the surface tension of known glasses at a diameter of about 30-millionths of an inch is such that the glass is somewhat friable and breakage occurs. Interrelated with this difficulty so as to be part and parcel of the same problem is the fact that most glasses of the type usable for blown glasses melt at relatively high temperatures which leads to the lowering of the glass tensions to such an extent that the noted breakage occurs.

Accordingly a glass composition capable of satisfactorily producing strands or fibers of the order of 10-20 millionths of an inch thickness must satisfy the following particular requirements:

1. The glass must have, when molten, a high viscosity. By this is meant that the interfacial tension must be high.
2. The molten glass must have a low surface tension which permits it to be drawn out into long thin strands.
3. The glass composition must have a low softening point, preferably in the range of 1800 to 1900° F.
4. The glass must have a high resistivity to chemical attack.

While some of these requirements may be fulfilled by known glasses, no glass composition which fulfills all of the above requirements has heretofore been made available.

Such a glass composition is desirable for many applications such as the production of very thin insulating materials in filters where a thickness of 30-millionths of an inch is unsuitable. Further it may be noted that many fiber glasses induce a sensitivity in the hands and accordingly manual operations are somewhat hindered thereby. As the diameter of the glass is reduced the effect on the skin is less noticeable and accordingly the attainment of lower diameters is desirable from this point of view.

It is a primary object of this invention to provide a glass composition which meets all of the requirements set forth above.

It is an important object of the present invention to provide a glass composition which permits of the production of glass fibers or strands having a diameter in the range of 10 to 20-millionths of an inch.

I have found that these and other objects of the invention may be accomplished by incorporating into a glass composition approximately 10% by weight of metallic oxide selected from the group of copper and lead oxides and maintaining the weight ratio of the magnesium and calcium oxide in the composition to the selected oxide relatively low in order to secure the required low softening point. Further the content of the selected oxide may vary between about 9 to 10.5 percent of the weight of the glass, but the sum total of the selected oxide, the magnesium and calcium oxides should always be substantially constant, that is, if the selected oxide weight is lowered the magnesium or calcium oxide or the total of both should be increased to the same extent. The glass composition may be formed by any of the usual methods known to the art and accordingly no description of these methods of formulation will be given herein.

The invention may be explained more fully by reference to the following examples of glass compositions which are particularly suitable for the practice of the invention.

Example I

| Constituent: | Percent by weight |
|---|---|
| $SiO_2$ | 54.3 |
| CaO | 6.92 |
| MgO | 4.12 |
| $Na_2O$ | .36 |
| $B_2O_3$ | 10.5 |
| $Al_2O_3$ $TiO_2$ $Fe_2O_3$ | 13.98 |
| CuO | 9.82 |
| Total | 100.00 |

Example II

| | |
|---|---|
| $SiO_2$ | 54.3 |
| CaO | 6.92 |
| MgO | 4.12 |
| $Na_2O$ | .36 |
| $B_2O_3$ | 10.5 |
| $Al_2O_3$ ⎫ | |
| $TiO_2$ ⎬ | 13.9 |
| $Fe_2O_3$ ⎭ | |
| PbO | 9.9 |
| Total | 100.00 |

The component containing the $Al_2O_3$ plus $TiO_2$ plus $Fe_2O_3$, set forth in the above examples, generally comprises a small amount of $Fe_2O_3$ and $TiO_2$, the prime portion being $Al_2O_3$. A typical breakdonw of this component shows in parts by weight:

| | |
|---|---|
| $Al_2O_3$ | 55.52 |
| $TiO_2$ | .54 |
| $Fe_2O_3$ | .43 |
| | 56.49 |

Example III

A commercial batch may be produced by using the following components in parts by weight:

| | |
|---|---|
| Sand | 194.8 |
| Burnt lime | 37.6 |
| Clay | 69.6 |
| Boric acid | 89.2 |
| Aluminum hydrate | 42.0 |
| Fluorspar | 6.0 |
| Salt cake | 3.2 |
| CuO | 40.0 |

A typical chemical analysis of the above components follows:

| | | $SiO$ | CaO | MgO | $Na_2O$ | $B_2O_3$ | $Fe_2O_3$ | $T.O_2$ | $Al_2O_3$ | $K_2O$ | CuO |
|---|---|---|---|---|---|---|---|---|---|---|---|
| Sand | 194.8 | 189.72 | 1.31 | .97 | | | .035 | .029 | .33 | .07 | |
| Burnt Lime | 37.6 | .03 | 21.41 | 15.77 | | | .03 | | .06 | | |
| Clay | 69.6 | 31.31 | .084 | | | | .337 | .508 | 27.7 | | |
| Boric Acid | 89.2 | | | | | 49.95 | | | | | |
| Aluminum Hydrate | 42.0 | .008 | | | | | .005 | .002 | 27.24 | | |
| Flourspar | 6.0 | .242 | 5.35 | | | | .023 | | .188 | | |
| Salt Cake | 3.2 | | | | 1.40 | | | | | | |
| CuO | 40.0 | | | | | | | | | | 40.0 |
| | 482.4 | 221.31 | 28.154 | 16.74 | 1.40 | 49.95 | .430 | .539 | 55.52 | .07 | 40.0 |

The moisture content of the various constituents is not specifically set forth above but may be derived from the component weight and the summation of the constituent oxides in each case.

Example IV

| | |
|---|---|
| $SiO_2$ | 54.33 |
| CaO | 7.43 |
| MgO | 4.05 |
| $Na_2O$ | .37 |
| $B_2O_3$ | 10.2 |
| $Al_2O_3$ ⎫ | |
| $TiO_2$ ⎬ | 14.60 |
| $Fe_2O_3$ ⎭ | |
| CuO | 9.02 |
| | 100.00 |

Example V

| | |
|---|---|
| $SiO_2$ | 54.75 |
| CaO | 6.35 |
| MgO | 3.98 |
| $Na_2O$ | .35 |
| $B_2O_3$ | 10.4 |
| $Al_2O_3$ ⎫ | |
| $TiO_2$ ⎬ | 13.75 |
| $Fe_2O_3$ ⎭ | |
| PbO | 10.42 |
| | 100.00 |

It will be noted that in each of the foregoing examples that the total of the selected oxide and the magnesium and calcium oxides is approximately 20 percent by weight of the glass. Further in each instance the ratio of the sum of the calcium and magnesium weights to that of the selected oxide is very close to 1:1. Under these conditions the softening points of the glass are low for this type of material, that is about 1800 to 1900 degrees Fahrenheit. Further the glasses when molten will have the low surface tension and high interfacial tension required for the production of fibers in the range of 10 to 20-millionths of an inch diameter.

It will be understood that this invention is susceptible to modification in order to adopt it to different usages and conditions and accordingly it is desired to comprehend such modifications within this invention as may fall within the scope of the appended claims.

I claim:

1. A fine glass fiber having substantially the following composition by weight:

| | Percent |
|---|---|
| $SiO_2$ | 54.3–54.75 |
| CaO | 6.35–7.43 |
| MgO | 3.98–4.12 |
| $B_2O_3$ | 10.2–10.5 | more than 9 percent and less than 10.5 percent of an oxide selected from the group of copper and lead oxides, the balance being essentially aluminum oxide.

2. A fine glass fiber having substantially the following composition by weight:

| | Percent |
|---|---|
| $SiO_2$ | 54.3 |
| CaO | 6.92 |
| MgO | 4.1 |
| $B_2O_3$ | 10.5 | and more than 9 percent and less than 10.5 percent of an oxide selected from the group of copper and lead oxides, the balance consisting essentially of aluminum oxide.

3. A fine glass fiber having substantially the following composition, by weight:

| Constituent: | Percent by weight |
|---|---|
| $SiO_2$ | 54.30 |
| CaO | 6.92 |
| MgO | 4.12 |
| $Na_2O$ | 0.36 |
| $B_2O_3$ | 10.50 |
| $R_2O_3+TiO_2$ | 13.98 |
| CuO | 9.82 |

4. A fine glass fiber having substantially the following composition, by weight:

| Constituent: | Percent by weight |
|---|---|
| $SiO_2$ | 54.30 |
| CaO | 6.92 |
| MgO | 4.12 |
| $Na_2O$ | 0.36 |
| $B_2O_3$ | 10.50 |
| $R_2O_3+TiO_2$ | 13.90 |
| PbO | 9.90 |

5. A fine glass fiber having substantially the following composition, by weight:

Constituent: Percent by weight
- $SiO_2$ — 54.33
- $CaO$ — 7.43
- $MgO$ — 4.05
- $Na_2O$ — 0.37
- $B_2O_3$ — 10.20
- $R_2O_3 + TiO_2$ — 14.60
- $CuO$ — 9.02

6. A fine glass fiber having substantially the following composition, by weight:

Constituent: Percent by weight
- $SiO_2$ — 54.75
- $CaO$ — 6.35
- $MgO$ — 3.98
- $Na_2O$ — 0.35
- $B_2O_3$ — 10.40
- $R_2O_3 + TiO_2$ — 13.75
- $PbO$ — 10.42

7. A fine glass fiber made from a batch, which batch has substantially the following composition:

Constituent: Parts by weight:
- Sand — 194.8
- Burnt lime — 37.6
- Clay — 69.6
- Boric acid — 89.2
- Aluminum hydrate — 42.0
- Fluorspar — 6.0
- Salt cake — 3.2
- $CuO$ — 40.0

References Cited in the file of this patent

UNITED STATES PATENTS

| Number | Name | Date |
|---|---|---|
| 1,529,259 | Locke et al. | Mar. 10, 1925 |
| 2,100,391 | Grimm et al. | Nov. 30, 1937 |
| 2,394,493 | Schoenlaub | Feb. 5, 1946 |
| 2,517,459 | Armistead | Aug. 1, 1950 |